United States Patent
Singh

(10) Patent No.: US 12,022,298 B2
(45) Date of Patent: Jun. 25, 2024

(54) BANDWIDTH ALLOCATION AND MANAGEMENT IN A WIRELESS NETWORK

(71) Applicant: Charter Communications Operating, LLC, St. Louis, MO (US)

(72) Inventor: Lakhbir Singh, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 636 days.

(21) Appl. No.: 17/008,965

(22) Filed: Sep. 1, 2020

(65) Prior Publication Data

US 2022/0070678 A1 Mar. 3, 2022

(51) Int. Cl.
| | |
|---|---|
| *H04W 16/14* | (2009.01) |
| *H04W 48/16* | (2009.01) |
| *H04W 60/02* | (2009.01) |
| *H04W 72/0453* | (2023.01) |
| *H04W 72/563* | (2023.01) |

(52) U.S. Cl.
CPC ........... *H04W 16/14* (2013.01); *H04W 48/16* (2013.01); *H04W 60/02* (2013.01); *H04W 72/0453* (2013.01); *H04W 72/563* (2023.01)

(58) Field of Classification Search
CPC ..... H04W 16/02; H04W 16/14; H04W 24/02; H04W 48/16; H04W 60/02; H04W 72/0453; H04W 72/06; H04W 76/11; H04W 76/25
See application file for complete search history.

(56) References Cited

U.S. PATENT DOCUMENTS

| | | | | |
|---|---|---|---|---|
| 2017/0034826 A1* | 2/2017 | Shahar | ............... | H04J 11/0056 |
| 2017/0055268 A1* | 2/2017 | Aksu | ............... | H04W 16/14 |
| 2019/0124665 A1* | 4/2019 | Singh | ............... | H04W 72/52 |
| 2020/0077457 A1* | 3/2020 | Sevindik | ............... | H04W 72/542 |
| 2020/0187098 A1* | 6/2020 | Dhillon | ............... | H04W 16/16 |
| 2020/0267563 A1* | 8/2020 | Sevindik | ............... | H04W 16/14 |
| 2021/0234964 A1* | 7/2021 | Khawer | ............... | H04M 15/66 |

* cited by examiner

*Primary Examiner* — Srinivasa R Reddivalam
(74) *Attorney, Agent, or Firm* — Armis IP Law, LLC

(57) ABSTRACT

A network environment includes a communication management resource in communication with customer premises equipment through a wireless base station. The communication management resource (such as a spectrum access system) receives a request for allocation of a wireless channel from customer premises equipment. The request is generated via the customer premises equipment and communicated through the wireless base station to the communication management resource. In addition to receiving the allocation request from the customer premises equipment, the communication management resource receives channel selection information from the wireless base station. Via the channel selection information, the wireless base station suggests/selects a wireless channel to assign for use by the customer premises equipment. In response to receiving the request, and in accordance with the channel selection information, the communication management resource allocates a selected wireless channel to the customer premises equipment as indicated by the channel selection information.

41 Claims, 10 Drawing Sheets

CHANNEL
ALLOCATION
INFO.
195

W.B.S. 132 ......... WCH #6, WCH #8

W.B.S. 131 ......... WCH #7, WCH #9, WCH #10, WCH #11

W.B.S. 133 ......... WCH #2, WCH #5

FIG. 2

BANDWIDTH ALLOCATION AND MANAGEMENT IN A WIRELESS NETWORK

BACKGROUND

Conventional wireless networks typically include one or more wireless base stations to provide respective communication devices access to a remote network such as the Internet. One type of base station is a so-called CBSD (Citizen Broadband Radio Service Device). Such a device uses a wireless channel allocated from a CBRS (Citizens Band Radio Service) band to support communications with one or more mobile communication devices.

Typically, one or more wireless channels is allocated to a base station by a so-called SAS (Spectrum Access System) to support communications with one or more communication devices or so-called customer premises equipment. For example, a base station can be configured to communicate with the SAS to receive notification of one or more wireless channels allocated for its use.

In certain instances, a respective wireless base station provides one or more instances of so-called customer premises equipment access to a remote network via use of allocated one or more wireless channels. If the customer premises equipment in communication with the wireless base station transmits communications above a respective power threshold value, such as a highest allowable power level, the customer premises equipment must also register with the SAS for allocation of one or more wireless channels.

Subsequent to allocation, the customer premises equipment communicates so-called heartbeat request messages through the wireless base station to the spectrum access system in order to continue use of the allocated one or more wireless channels. For example, the customer premises equipment is able to continue using the allocated wireless channel if the SAS communicates a heartbeat response to the customer premises equipment. An allocated channel can be revoked an entity having higher priority requires use of the channel.

BRIEF DESCRIPTION OF EMBODIMENTS

There are deficiencies associated with conventional techniques of allocating wireless channels (such as out of CBRS band) for use by customer premises equipment in communication with a remote network through a wireless base station. For example, a wireless base station may be allocated multiple wireless channels for use in communication with other devices such as customer premises equipment. Multiple instances of customer premises equipment (such as first customer premises equipment, second customer premises equipment, third customer premises equipment, etc.) connecting to the wireless base station may get assigned the same channel by the SAS (such as a first channel) allocated to the wireless base station in which to communicate through the wireless base station to the remote network. In such an instance, the first channel allocated to the wireless base station may be heavily burdened with much traffic while a second allocated channel may be only lightly used or not used at all. It is desirable to spread the wireless communications load across multiple different channels.

Embodiments herein provide novel ways of enabling a wireless base station (such as a CBSD) to assist/influence the process of allocating wireless channels by a communication management resource such as a SAS to customer premises equipment in communication with the wireless base station.

For example, in accordance with general embodiments, a network environment includes a communication management resource in communication with customer premises equipment through a wireless base station. The communication management resource (such as a spectrum access system or other suitable entity) receives a request for allocation of a wireless channel from customer premises equipment. In one embodiment, the request is generated via the customer premises equipment and communicated through the wireless base station to the communication management resource. In addition to receiving the request from the customer premises equipment, the communication management resource receives channel selection information (identity of one or more channels) from the wireless base station.

Via the channel selection information, the wireless base station selects a less loaded wireless channel in which to assign to the customer premises equipment. For example, the wireless base station generates the channel selection information to suggest (to the communication management resource) the less loaded or less used one or more wireless channels to the communication management resource for possible assignment to the customer premises equipment. In response to receiving the request, and in accordance with the channel selection information suggesting the less loaded wireless channel, the communication management resource selects and/or allocates a wireless channel to the customer premises equipment as indicated by the channel selection information. In this manner, the wireless base station controls, to some extent, which wireless channel is to be used by the different instances of customer premises equipment that it supports.

In yet further example embodiments, the communication management resource receives the channel selection information from the wireless base station in response to the communication management resource or other suitable entity notifying the wireless base station of the request.

Further embodiments herein include, via the communication management resource, communicating identities of multiple wireless channels to the wireless base station. The wireless base station or other suitable entity selects a wireless channel from the multiple wireless channels. In one embodiment, the multiple wireless channels are already allocated for use by the wireless base station.

Yet further embodiments herein include, via the communication management resource, determining an identity of the selected wireless channel from the channel selection information. Allocation of the selected wireless channel to the customer premises equipment includes communicating an allocation message from the communication management resource through the wireless base station to the customer premises equipment. The allocation message from the communication management resource indicates the identity of the selected wireless channel allocated to the customer premises equipment.

In accordance with still further example embodiments, the request is transmitted from the customer premises equipment over a first wireless channel to the wireless base station prior to the wireless base station forwarding the request to the communication management resource. In one embodiment, the selected wireless channel allocated for use by the customer premises equipment is a second wireless channel, different than the first wireless channel.

Subsequent to allocation of the second wireless channel to the customer premises equipment and use of the second wireless channel by the customer premises equipment, the communication management resource receives a heartbeat request from the customer premises equipment. The heartbeat request requests permission to continue using the second wireless channel. In response to receiving the heartbeat request, the communication management resource communicates a heartbeat response to the customer premises equipment (allowing continued use of the second wireless channel by the customer premises equipment).

In yet further example embodiments, the wireless channel (such as selected by the wireless base station) is a channel allocated by the communication management resource from a tiered hierarchy of wireless channels in which an incumbent (such as the government or other high priority entity) user has higher priority rights than the customer premises equipment and the wireless base station.

Still further example embodiments include, at the communication management resource, receiving an identity of the wireless base station from the customer premises equipment generating the request for allocation of the wireless channel. In one embodiment, the communication management resource receives the identity of the wireless base station from the customer premises equipment during registration of the customer premises equipment with the communication management resource.

In accordance with another example embodiment, the channel selection information and corresponding allocation in accordance with the channel selection information provides load balancing of wireless communications conveyed from multiple instances of customer premises equipment through the wireless base station to a remote network. In other words, embodiments herein provide a way for the wireless base station or other suitable entity to control/influence load balancing amongst multiple different wireless channels in which multiple instance of customer premises equipment communicate through the wireless base station to the remote network.

In further example embodiments, in a similar manner as previously discussed, the communication management resource receives a request for allocation of a wireless channel from customer premises equipment. The request is conveyed through a wireless base station to the communication management resource. The communication management resource then notifies the wireless base station of receiving the request. In response to the communication management resource notifying the wireless base station of the request for allocation of a wireless channel, the communication management resource receives channel selection information from the wireless base station. In one embodiment, the channel selection information indicates a selected wireless channel in which to allocate to the wireless base station.

Further embodiments herein include, via the communication management resource, determining an identity of the selected wireless channel from the channel selection information; allocating the selected wireless channel for use by the customer premises equipment; and communicating an allocation message through the wireless base station to the customer premises equipment. The allocation message indicates the identity of the selected wireless channel allocated to the customer premises equipment.

In still further example embodiments, the request is transmitted from the customer premises equipment over a first wireless channel to the wireless base station; the wireless base station forwards the request to the communication management resource. The selected wireless channel is a second wireless channel subsequently allocated to the customer premises equipment.

In one embodiment, the communication management resource selects (allocates) the wireless channel from a tiered hierarchy of wireless channels in which an incumbent user has higher priority rights than the customer premises equipment and wireless base station.

In accordance with further example embodiments, the communication management resource communicates identities of multiple wireless channels to the wireless base station such as via prior allocation of channels to the wireless base station. In one embodiment, the selected wireless channel is one of the multiple wireless channels.

As previously discussed, embodiments herein are useful over conventional techniques. For example, a wireless base station provides useful feedback to a spectrum access system (or other suitable entity) regarding which of one or more wireless channels is best suited for allocation to requesting customer premises equipment. Accordingly, embodiments herein provide a unique way in which the wireless base station is able to participate in allocation of one or more wireless channels in a network environment. In one embodiment, the channel selection information provided by the wireless base station enables the wireless base station to steer or control, to some extent, load-balancing and use of wireless channels allocated to the wireless base station such that not all instances of the customer premises equipment in communication with the wireless base station use the same allocated wireless channel.

In one embodiment, the system operates as follows:

1) The CBSD (wireless base station providing connectivity to a customer premises equipment) broadcasts its unique identifier value or unique serial number in e.g., sysinfo 1 message 2) The HP-CPE (customer premises equipment) attaches to the serving CBSD.

3) HP-CPE sends a registration request to the SAS (through the wireless base station) along with serial number of the CBSD to which it is wirelessly connected.

4) The SAS sends a registration response to the CBSD customer premises equipment.

5) The HP-CPE sends a frequency grant request through the wireless base station to the SAS.

6) The SAS identifies serving CBSD based on the reported serial number of the serving CBSD (wireless base station) from step 3 by HP-CPE.

7) The SAS notifies serving CBSD (wireless base station) about HP-CPE grant request.

8) CBSD responds back with suggested frequency allocation for HP-CPE.

9) The SAS sends frequency grant through the CBSD wireless base station to the HP-CPE.

10) The HP-CPE moves to new granted carrier frequency if needed and sends heartbeat request to SPECTRUM ACCESS SYSTEM over new granted carrier frequency.

11) SAS responds with heartbeat response and authorizes the HP-CPE to resume normal operation.

These and other more specific additional embodiments are disclosed herein as further discussed below.

Note that any of the resources as discussed herein can include one or more computerized devices, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate management of communications in a network environment. The instructions, when executed by computer processor hardware, cause the computer processor hardware (such as one or more co-located or disparately processor devices) to: receive a request for allocation of a wireless channel from customer premises equipment at a communication management resource, the request conveyed through a wireless base station; at the communication management resource, receive channel selection information from the wireless base station; and in response to receiving the request, allocate a selected wireless channel as indicated by the channel selection information to the customer premises equipment.

Another embodiment as described herein includes a computer readable storage medium and/or system having instructions stored thereon to facilitate management of communications in a network environment. The instructions, when executed by computer processor hardware, cause the computer processor hardware (such as one or more co-located or disparately processor devices) to: receive a request for allocation of a wireless channel from customer premises equipment, the request conveyed through a wireless base station; notify the wireless base station of the request; and in response to the notifying, receive channel selection information from the wireless base station, the channel selection information indicating a selected wireless channel in which to allocate to the wireless base station.

The ordering of the steps above has been added for clarity sake. Note that any of the processing steps as discussed herein can be performed in any suitable order. Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of supporting wireless connectivity. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIG. 2 is an example diagram illustrating channel allocation information according to embodiments herein.

Figure 1:
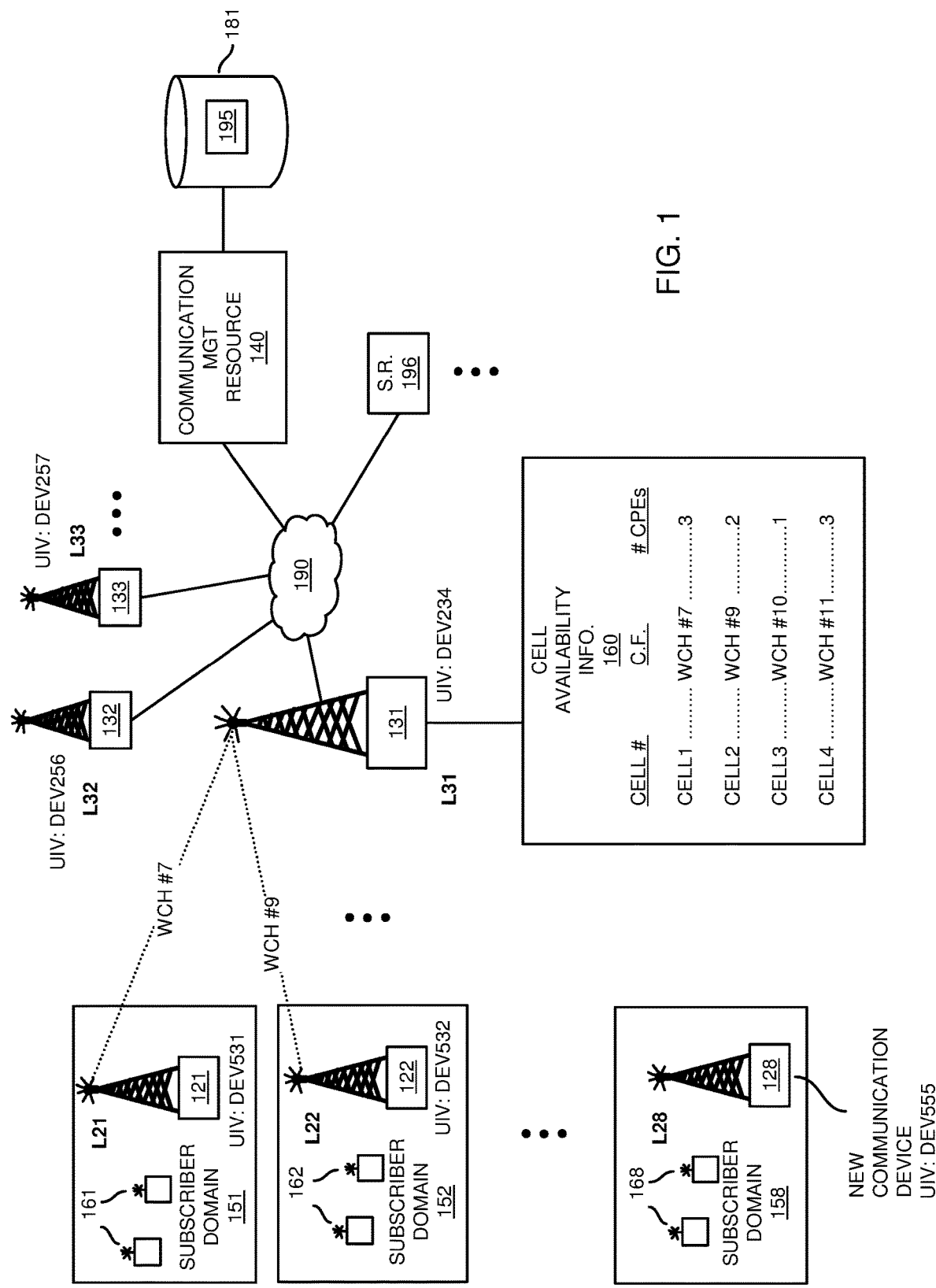
FIG. 1 is an example diagram illustrating a wireless network environment and allocation of wireless channels according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

In accordance with general embodiments, a network environment includes a communication management resource in communication with customer premises equipment through a wireless base station. The communication management resource (such as a spectrum access system) receives a request for allocation of a wireless channel from customer premises equipment. In one embodiment, the request is generated via the customer premises equipment and communicated through the wireless base station to the communication management resource. In addition to receiving the request from the customer premises equipment, the communication management resource receives channel selection information from the wireless base station. The channel selection information provided by the wireless base station (or other suitable entity) assists the communication management resource 140 in allocating a wireless channel to the customer premises equipment. In one embodiment, the wireless base station selects a less loaded wireless channel in which to assign/allocate to the customer premises equipment.

Via the channel selection information, the wireless base station suggests (to the communication management resource) the less loaded or less used wireless channel to the communication management resource for assignment to the customer premises equipment. In response to receiving the request, and in accordance with the channel selection information suggesting a less loaded wireless channel to the communication management resource, the communication management resource allocates the selected wireless channel (such as currently less loaded wireless channel) as indicated by the channel selection information to the customer premises equipment.

Now, more specifically, FIG. 1 is an example diagram illustrating a wireless network environment and allocation of wireless channels according to embodiments herein.

In this example embodiment, network environment 100 includes communication management resource 140 (allocation management resource such as a spectrum access system and/or domain proxy), and network 190 (such as a packet-switched network or other suitable entity to convey data), wireless base station 131, wireless base station 132, wireless base station 133, and multiple subscriber domains 151, 152, . . . , 158, etc.

The wireless base stations 131, 132, 133, etc., support any suitable wireless communication protocol. In one embodiment, the wireless base station 131 supports communications with respective customer premises equipment 121, 122, . . . , 128, in accordance with an LTE (Long Term Evolution) wireless communication protocol using allocated wireless channels.

Each of the subscriber domains includes respective instance of customer premises equipment. For example, customer premises equipment 121 resides in subscriber domain 151; customer premises equipment 122 resides in subscriber domain 152; . . . , wireless base station 128 resides in subscriber domain 158, etc.

Note that each of the resources as described herein can be implemented as hardware, software, or a combination of hardware and software. For example, the communication management resource 140 can be implemented as communication management hardware, communication management software, or a combination of communication management hardware and software; the wireless base station 131 can be implemented as wireless base station hardware, wireless base station software, or a combination of wireless base station hardware and software; the customer premises equipment 128 can be implemented as customer premises equipment hardware, customer premises equipment software, or a combination of customer premises equipment hardware and software; and so on.

As further shown in this example embodiment, the wireless base station 131 is assigned unique identifier value DEV234 and resides at location L31. Wireless base station 131 produces/tracks cell availability information 131 indicating available cells (such as CBSD cells) supported by the wireless base station 131.

In this example embodiment, the cell availability information 160 indicates that the wireless base station 131 supports multiple cells (such as different networks) including cell #1, cell #2, cell #3, cell #4.

Assume further in this example embodiment that the wireless base station 131 communicates with the communication management resource 140 for allocation of wireless bandwidth to support wireless connectivity in the network environment 100. For example, via communications from the wireless base station 131 to the communication management resource 140, the wireless base station 131 receives allocation of wireless channel #7 (to support cell #1), wireless channel #9 (to support cell #2), wireless channel #10 (to support cell #3), and wireless channel #11 (to support cell #4).

In this example embodiment, the cell availability information 160 further indicates the one or more different wireless channels allocated by the communication management resource 140 to support a respective cell. For example, cell availability information 160 indicates that allocated wireless channel #7 supports wireless connectivity associated with cell #1; load information for cell #1 in the cell availability information 160 indicates that three instances of customer premises equipment currently use wireless services provided by cell #1 via wireless channel #7.

Cell availability information 160 further indicates that allocated wireless channel #9 supports wireless connectivity associated with cell #2; load information for cell #2 indicates that two instances of customer premises equipment currently use wireless services provided by cell #2 via wireless channel #9.

Cell availability information 160 further indicates that allocated wireless channel #10 supports wireless connectivity associated with cell #3; load information for cell #3 indicates that one instance of customer premises equipment currently uses wireless services provided by cell #3 via wireless channel #10.

Cell availability information 160 indicates that allocated wireless channel #11 supports wireless connectivity associated with cell #4; load information associated with cell #4 indicates that three instances of customer premises equipment currently use wireless services provided by cell #4.

Thus, in this example embodiment, the cell availability information 160 indicates that wireless channel #1 and cell #4 are most heavily loaded with 3 instances of customer premises equipment each. The cell availability information 160 also indicates that cell #3 is least heavily loaded (i.e., only customer premises equipment is supported). Cell availability information 160 indicates that cell #2 is moderately loaded (2 instances of customer premises equipment).

In such an instance, the available cell #2 is least congested and has the best ability to provide wireless services to respective new wireless base station 131.

Communication management resource 140 keeps track of the different wireless channels allocated to one or more wireless base stations 131, 132, 133, etc., providing wireless connectivity to the different instances of customer premises equipment based on location. In one embodiment, the communication management resource 140 accounts for the locations of the communication devices (such as wireless base station, customer premises equipment, etc.) when allocating wireless channels for use.

FIG. 2 is an example diagram illustrating channel allocation information according to embodiments herein.

As shown in FIG. 2, the communication management resource 140 (a.k.a., an allocation management resource) keeps track of channel allocation information 195 indicating wireless channels allocated for use by each of the wireless base stations in the network environment 100.

In one embodiment, as previously discussed, the communication management resource 140 allocates wireless channels based on location such that two or more wireless base stations in the same location do not cause substantial interference to each other.

For example, assume that the wireless base stations 131, 132, and 133 are fairly close in proximity to each other and may cause interference if they are allocated the same channel. To reduce interference or possibility of interference, the communication management resource 140 allocates wireless base station 131 use of wireless channels #7, #9, #10, and #11; the communication management resource 140 allocates wireless base station 132 use of wireless channels #6 and #8; the communication management resource 140 allocates wireless base station 133 use of wireless channels #2 and #5.

As further discussed herein, note that the customer premises equipment operating in the network environment 100 may be communication devices that operate at transmit power level greater than a threshold value. In such an instance, each of the instances of customer premises equipment must register with the communication management resource 140 (as do wireless base station 131, 132, 133) to use one or more respective wireless channels.

Figure 3:
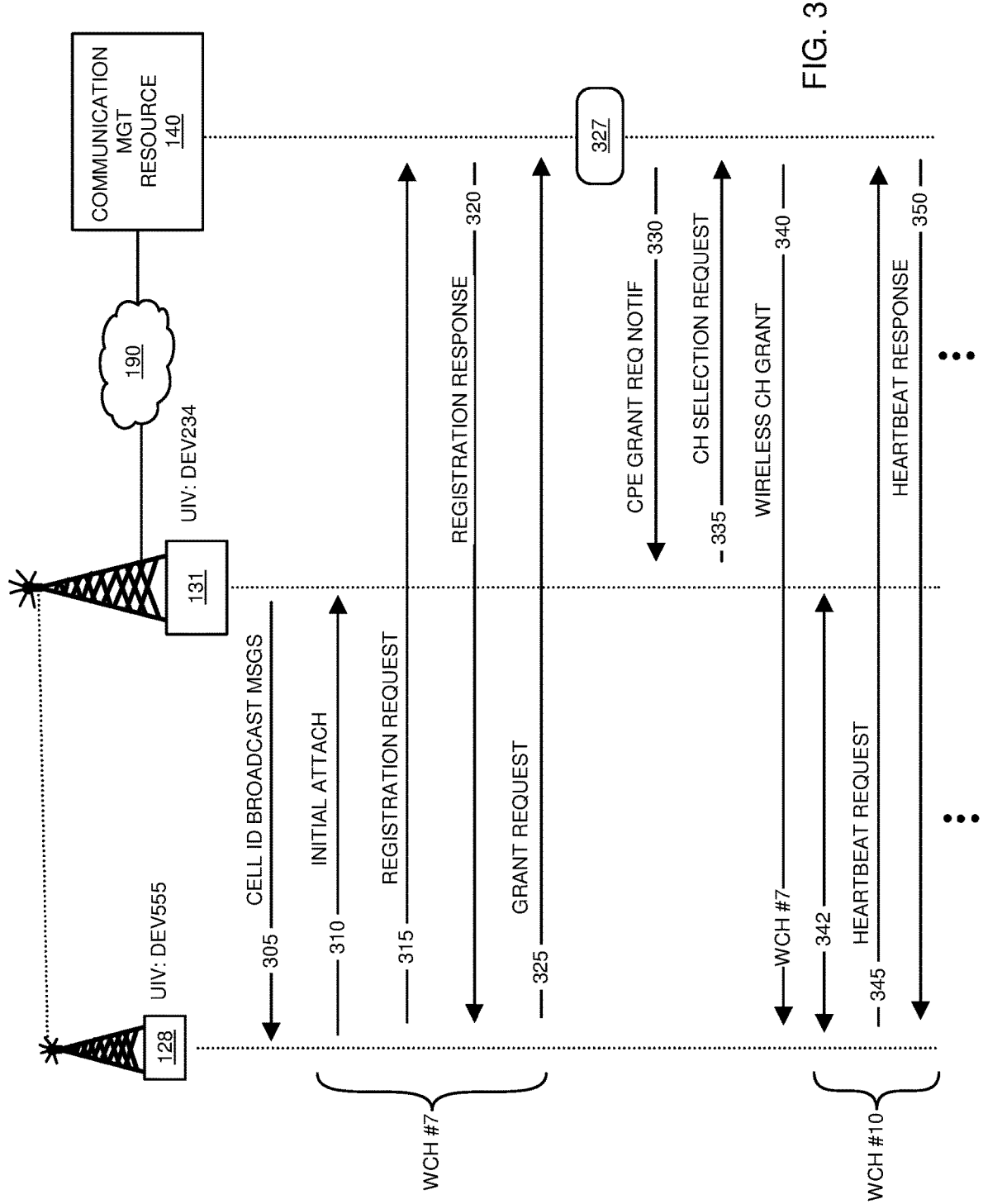
FIG. 3 is an example diagram illustrating conveyance of communications amongst multiple communication devices and wireless channel allocation management according to embodiments herein.

FIG. 3 is an example diagram illustrating communications amongst multiple communication devices and wireless channel allocation management according to embodiments herein.

Note that embodiments herein provide better allocation of wireless channels in a network environment such that a group of different instances of customer premises equipment do not all use the same wireless channel. For example, if the customer premises equipment was allowed to select a respective wireless channel (cell) supported by the wireless base station 131, then all of the instances of customer premises equipment could potentially select the same wireless channel #7 (cell #1) in which to wirelessly connect to the wireless base station 131. To prevent this situation, and provide better load-balancing, the wireless base station 131 participates in a novel process of controlling which of the multiple available wireless channels each of the instances of customer premises equipment is to use.

More specifically, via wireless communications 305 from the wireless base station 131 broadcasted in the network environment 100, the wireless base station 131 broadcasts notice of availability of the cell #1, cell #2, cell #3, cell #4. In one embodiment, the communications 305 include one or more wireless beacon communications transmitted from the wireless base station 131 into the wireless network environment 100.

Figure 4:
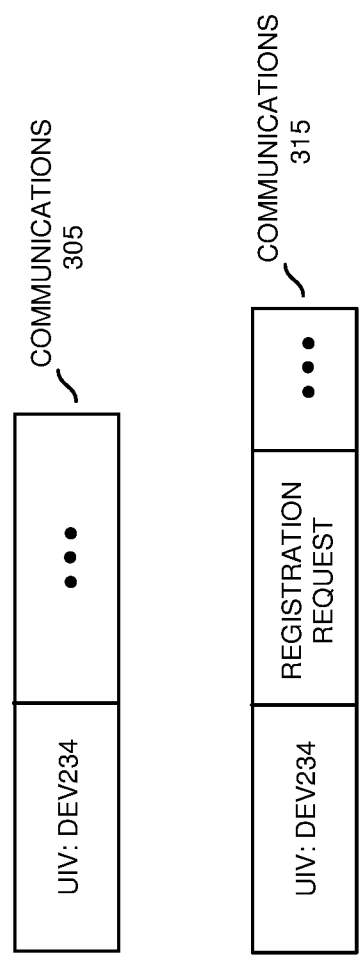
FIG. 4 is an example diagram illustrating communications according to embodiments herein.

In one embodiment, the communications 305 (as shown in FIG. 4) include a unique identifier value of DEV234 (such as a unique CBSD identifier value) assigned to the wireless base station 131. Accordingly, the customer premises equipment 128 is aware of the identity of the wireless base station 131 (such as a CBSD).

Referring again to FIG. 3, in response to receiving the communications 305, assume that the wireless base station 128 desires and decides to establish wireless connectivity with the wireless base station 131. In one embodiment, as previously discussed, the customer premises equipment 128 receives wireless communications indicating availability of the different cells including cell #1, cell #2, cell #3, cell #4 supported by the wireless base station 131. The customer premises equipment 128 selects a respective cell (such as cell #1 in this embodiment) in which to establish/initiate connectivity with the wireless base station 131 via communications 310.

In one embodiment, in order to use a respective wireless channel such as wireless channel #7 or any other wireless channel in the network environment 100, the customer premises equipment 128 needs to register with the communication management resource 140. This includes the customer premises equipment 128 generating and communicating a registration request to the communication management resource 140 via communications 315. In one embodiment, the customer premises equipment 128 transmits communications 315 over wireless channel #7. The wireless base station 131 forwards the payload of the communications 315 over network 190 to the communication management resource 140.

The registration request in communications 315 notifies the communication management resource 140 that the customer premises equipment 128 would like to establish respective wireless connectivity with the wireless base station 131.

FIG. 4 illustrates an example of communications 315 transmitted from the wireless base station 128 through wireless base station 131 to the communication management resource 140. In one embodiment, the communications 315 include a unique identifier value assigned to the wireless base station 131 as well as a respective registration request. Recall that the customer premises equipment 128 receives the unique identifier value DEV234 assigned to the wireless base station 131 via communications 305. Accordingly, the customer premises equipment 128 is aware of identity of the wireless base station 131. In one embodiment, the customer premises equipment 128 includes the unique identifier value of DEV234 (such as a unique CBSD identifier value or serial number of the wireless base station 131) in communications 315 to the communication management resource 140. Thus, the communication management resource 140 is aware of the identity of the wireless base station 131 to which the customer premises equipment 128 is trying to wirelessly connect.

Referring again to FIG. 3, via communications 320, in response to receiving the registration request in communications 315, the communication management resource 140 transmits a registration response (communications 320) to the wireless base station 128.

Subsequent to completing registration of the customer premises equipment 128 with the communication management resource 140 via communications 315 and communications 325, the customer premises equipment 128 communicates a grant request message in communications 325 through the wireless base station 131 to the communication management resource 140.

As its name suggests, the grant request message in communications 325 include a request for allocation of one or more wireless channels. In such an instance, the communication management resource 140 is now aware that the customer premises equipment 128 would like specific allocation of one or more wireless channels. In one embodiment, the customer premises equipment 128 provides notification of its location L28 (such as in communications 315, communications 325, etc.) to the communication management resource 140.

In processing function 327, the communication management resource 140 determines a respective identity of the wireless base station 131 (serving CBSD) to which the customer premises equipment 128 is trying to establish wireless connectivity. As previously discussed, the communication management resource 140 received the identity of the wireless base station 131 (namely, DEV234) in prior communications from the customer premises equipment 128 (such as communications 315).

In response to receiving the grant request in communications 325, the communication management resource 140 generates a respective customer premises equipment grant request notification in communications 330 to the wireless base station 131. This notified the wireless base station 131 that the customer premises equipment 128 is requesting grant of one or more wireless channels.

Figure 5:
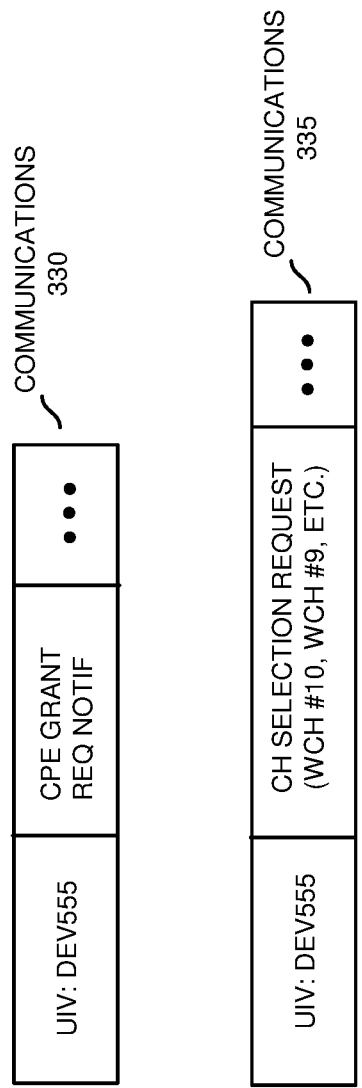
FIG. 5 is an example diagram illustrating communications supporting a grant request notification and channel selection information according to embodiments herein.

More specifically, the communications 330 as shown in FIG. 5 include the unique identifier value (DEV555) assigned to the requesting customer premises equipment 128 as well as a customer premises equipment grant request notification indicating that the customer premises equipment 128 assigned unique identifier value DEV555 is requesting allocation of one or more wireless channels via a grant request. In such an instance, the wireless base station 131 is made aware that the customer premises equipment 128 is now attempting to be allocated use of one or more wireless channels.

Referring again to FIG. 3, the wireless base station 131 responds to the communications 330 from communication management resource 140 with a channel selection request in communications 335 such as indicating one or more wireless channels in which to allocate for use by the customer premises equipment 128.

An example of the communications 335 is further shown in FIG. 5. In one embodiment, the communications 335 indicate/include a unique identifier value assigned to the customer premises equipment 128 (DEV555) as well as channel selection information (such as generated by the wireless base station 131 or other suitable entity) such as indicating WCH #10, WCH #9, etc., as preferred options in which to provide wireless connectivity between the wireless base station 131 in the customer premises equipment 128.

In this manner, although the customer premises equipment 128 originally attempts connectivity using wireless channel #7, the wireless base station 131 is able to provide notification and control load-balancing in its different available cells by notifying a priority in which to allocate (via communication management resource 140) one or more wireless channels to the customer premises equipment 128.

In one embodiment, the wireless base station 131 indicates a respective priority (such as wireless channel #10 being highest priority, wireless channel #9 being second highest priority, and so on) of each of multiple wireless channels for allocation to the customer premises equipment 128.

More specifically, the wireless base station 131 may indicate (via communications 335) that it is most desired that the customer premises equipment 128 be allocated use of wireless channel #10 because it is least used amongst all of the instances of customer premises equipment (see again cell availability information 160 indicating only one customer premises equipment using wireless channel #10); the wireless base station 131 may indicate (via communications 335) that it is second most desired that the customer premises equipment 128 be allocated use of wireless channel #9 because it is second least used amongst all of the instances of customer premises equipment (see again cell availability information 160 indicating only two instances of customer premises equipment using wireless channel #9); and so on.

Accordingly, via channel selection information communicated from the wireless base station 131 to the communication management resource 140, the wireless base station 131 participates in selection of a wireless channel to assign to the customer premises equipment 128.

Referring again to FIG. 3, in response to receiving communications 335, the communication management resource 140 determines if allocation of wireless channel #10 to the customer premises equipment 128 would cause interference to other nearby customer premises equipment or wireless base stations assigned the wireless channel #10.

Such a check prevents interference amongst communication devices. Via communications 340, the communication management resource 140 allocates use of wireless channel #10 to the customer premises equipment 128.

Assume that the allocation information 195 and corresponding analysis of the location of the customer premises equipment 128 with respect to other communication devices in the network environment 100 indicates that assignment of the wireless channel #10 to the customer premises equipment 128 would not result in wireless interference to other communication devices in wireless network environment 100. In such an instance, the communication management resource 140 communicates a wireless grant message in communications 340 through the wireless base station 131 to the customer premises equipment 128. In one embodiment, the communications 340 indicates allocation (grant) of the wireless channel #10 for use by the customer premises equipment 128. In one embodiment, the wireless base station 131 communicates the communications 340 over wireless channel #7 to the customer premises equipment 128.

Via communications 342, the customer premises equipment 128 establishes connectivity (such as via wireless channel #10) with the wireless base station 131 in lieu of using wireless channel #7 and accesses remote network 190 through wireless base station 131. In other words, in one embodiment, the customer premises equipment 128 retunes or configures its antenna hardware to communicate with the wireless base station 131 using the wireless channel #10 (second carrier frequency) instead of wireless channel #7 (first carrier frequency).

To ensure continued allocation of the wireless channel #10 to communicate in the network environment 100 with the wireless base station 131, the customer premises equipment 128 communicates heartbeat request communications 345. If the wireless channel #10 is still allocated to the customer premises equipment 128, the communication management resource 140 communicates respective heartbeat response communications 350 to the customer premises equipment 128. In one embodiment, the customer premises equipment 128 communicates a heartbeat request and receives a heartbeat response every few minutes, hours, or other suitable amount of time.

Note further that, in one embodiment, the customer premises equipment 128 communicates with the wireless base station 131 using wireless channel #7 for communications 310, 315, and 325. After grant of the wireless channel #10, such as via communications 342 and thereafter, the customer premises equipment 128 communicates with the wireless base station 131 via allocated wireless channel #10.

Figure 6:
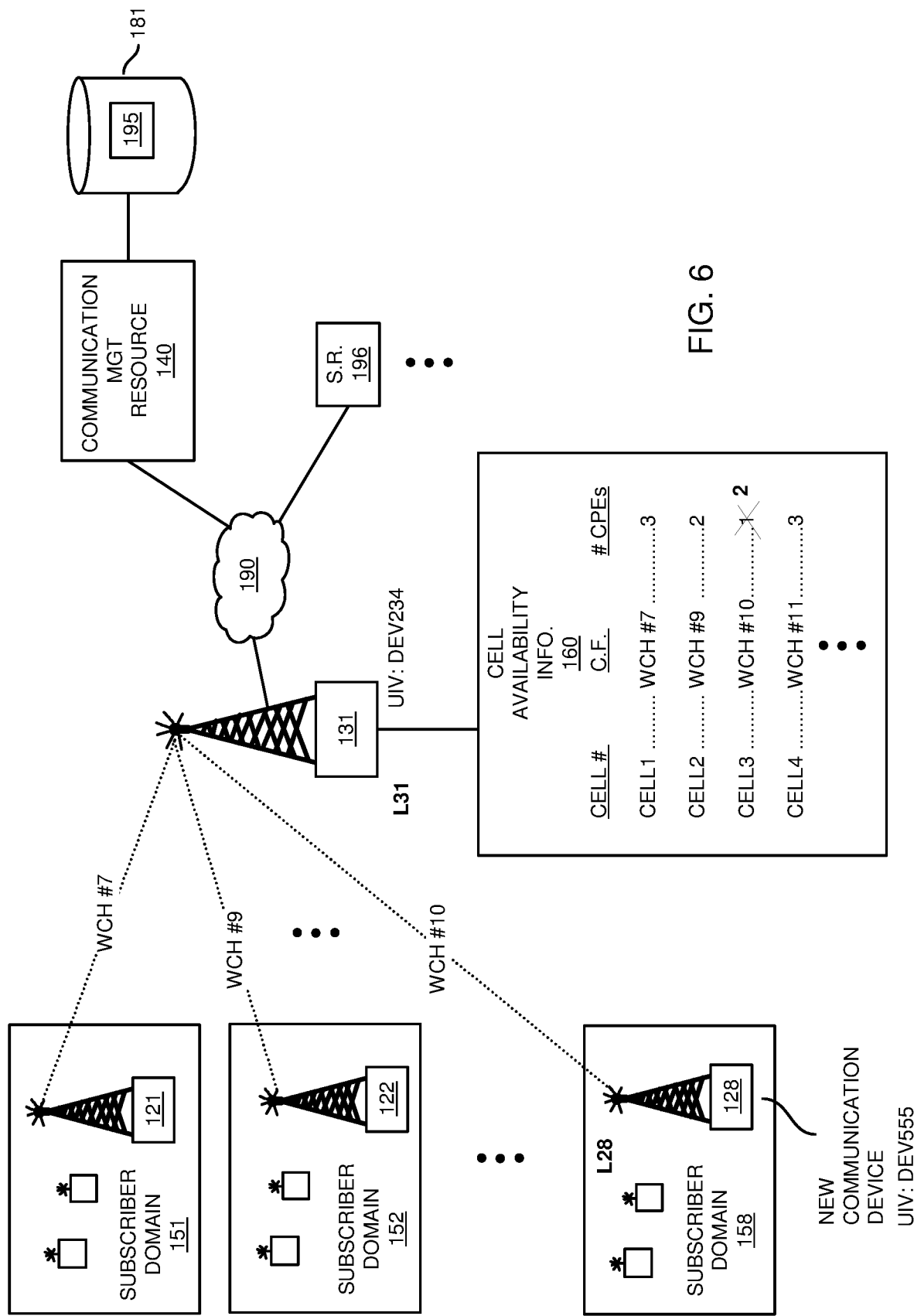
FIG. 6 is an example diagram illustrating connectivity between a new communication device and a wireless base station using allocated channels according to embodiments herein.

FIG. 6 is an example diagram illustrating connectivity between the new communication device (such as customer premises equipment) and a wireless base station using allocated channels according to embodiments herein.

Subsequent to allocation of the wireless channel #10 to the customer premises equipment 128, the wireless base station updates the cell availability information 160 to indicate that the customer premises equipment 128 uses the cell #3 to connect with the remote network 190 through the wireless base station 131. Additionally, as shown in FIG. 6, the wireless base station 131 (or other suitable entity) updates the cell availability information 160 to indicate that two instances of customer premises equipment share use of the wireless channel #10.

Thus, as previously discussed, the wireless base station 131 provides load-balancing of customer premises equipment amongst the different cells and corresponding wireless channels. More specifically, the cell #3 and corresponding wireless channel #10 now provide wireless connectivity to two instances of customer premises equipment, which is more in line with the loading (such as 2 instances of customer premises equipment supported by cell #2, #3 instances of customer premises equipment supported by cell #1, etc.) of the other cells. That is, no single cell is overloaded supporting too many instances of customer premises equipment.

Figure 7:
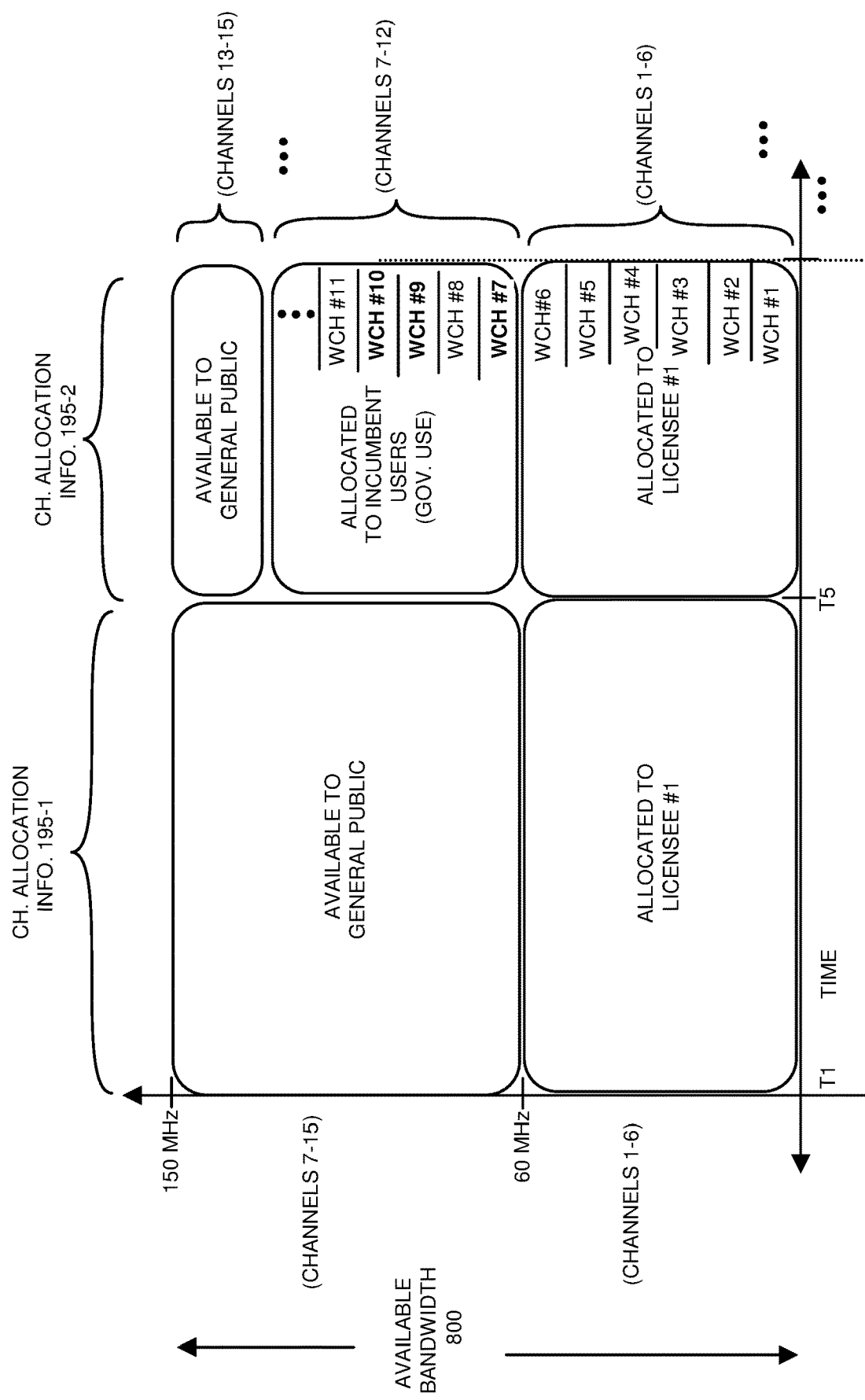
FIG. 7 is an example diagram illustrating modification of wireless spectrum usage according to embodiments herein.

FIG. 7 is an example diagram illustrating generation of dynamic channel allocation information indicating allocation of bandwidth at different tiers of a channel hierarchy according to embodiments herein.

As previously discussed, communication management resource 140 can be configured to allocate any suitable type of wireless spectrum (bandwidth, wireless channels, shared wireless channels, etc.) for use by the wireless base stations and customer premises equipment in the network environment 100.

In one non-limiting example embodiment, the communication management resource 140 allocates bandwidth from a so-called CBRS (Citizens Band Radio System) band (shared spectrum) operating between 3.550 and 3.700 GHz (GigaHertz) (such as 150 MegaHertz or 15 wireless channels that are each 10 MHz wide).

Figure 8:
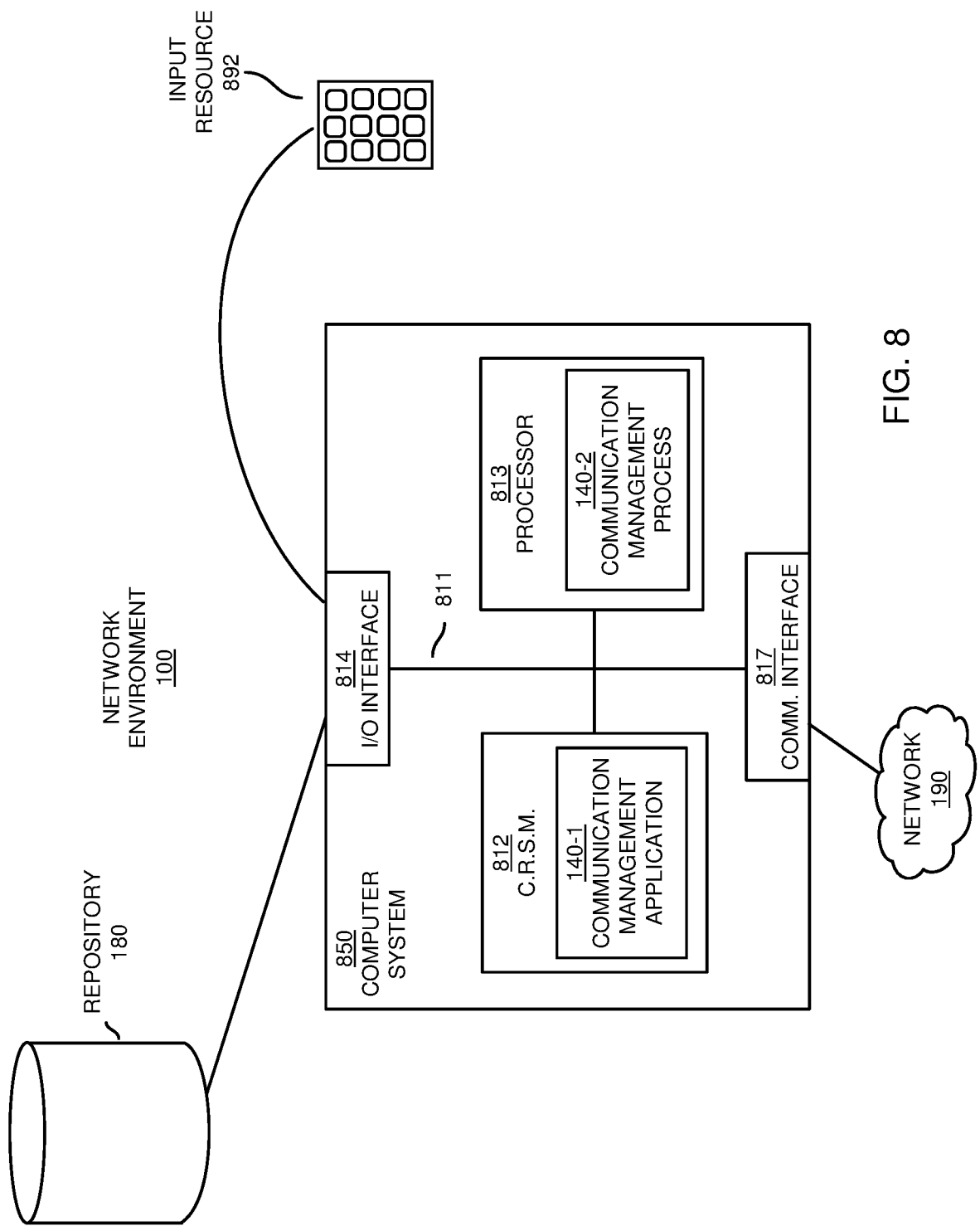
FIG. 8 is an example diagram illustrating an example computer architecture to execute one or more operations according to embodiments herein.

Also, as previously discussed, communication management resource 140 (such as spectrum access system, allocation management resource, or other suitable entity) keeps track, at any given time, which wireless channels or portions of the multi-tier shared wireless spectrum or multi-tier radio band (such as CBRS band) are available in the geographical region in which the network environment 100 resides. If government use (a so-called incumbent user) is detected or requested via appropriate input (such as around time T5) to the allocation management resource 140, certain channels are no longer available for use as shown in the content access information 195-2 as shown in FIG. 8.

More specifically, in this example, the channel availability information 195-1 (a first instance of allocation information 195) indicates that prior to time T5, channels 7-15 are available to the general authorized access users (general public or low priority users) for use; channels 1-6 are available for use by licensee #1. In a manner as previously discussed, these channels are allocated for use by the wireless base stations in network environment 100.

Further, as previously discussed, the wireless base station 131 provides wireless connectivity to multiple instances of customer premises equipment. For example, prior to time T5, the communication management resource 140 allocates use of wireless channel #7 to the wireless base station 131 and customer premises equipment 121 (such as a so-called high power customer premises equipment that also registers with the communication management resource 140) to provide communication devices 161 in subscriber domain 151 wireless access to the remote network 190. During operation, the customer premises equipment 121 receives communications from communication devices 161 in an uplink direction and forwards them to network 190. In a downlink direction, the wireless base station 131 receives communications from the remote network 190 and wirelessly forwards the received communications to the communication devices in 161.

Prior to time T5, in a manner as previously discussed, the communication management resource 140 also allocates use of wireless channel #10 to the wireless base station 131 and newly registered customer premises equipment 128 (such as a so-called high power customer premises equipment that also registers with the communication management resource 140) to provide communication devices 168 in subscriber domain 158 wireless access to the remote network 190. During operation, the customer premises equipment receives (such as over a wired or wireless link) communications from communication devices 168 in an uplink direction and forwards them to appropriate one or more destinations in network 190. In a downlink direction, the wireless base station 131 receives communications from the remote network 190 and wirelessly forwards the received communications (through customer premises equipment 128) to the communication devices 168.

As further shown, at or around time T5, assume that the communication management resource 140 receives input indicating use of a portion (channels 7-12) of the spectrum by an incumbent user such as the government. In such an instance, the allocation management resource 140 updates the channel availability information such that the channel allocation information 195-2 indicates that only channels 13-15 are allocated as being available to the general authorized access users; channels 7-12 are assigned for use by an incumbent entity requesting use or actually using the channels; wireless channels 1-6 are allocated for use by a first licensee. Thus, after time T5, the wireless channels 7-12 are no longer available for use by the lower priority users (i.e., general authorized access users).

In one embodiment, in response to revocation of the allocation of wireless channels 7-12, the communication management resource 140 notifies the wireless base station 131 at or around time T5 that the wireless base station 131 and corresponding customer premises equipment 128 are no longer able to use wireless channels #10 because it has been revoked and assigned for use by the incumbent user.

Thus, between time T1 and time T5, the wireless base station 131 uses the wireless channel #10 to provide the customer premises equipment 128 and corresponding communication devices 168 connectivity to the remote network 190. At or around time T5, the communication management resource 140 deallocates use of the wireless channel #10 from the wireless base station 131 in favor of use of the wireless channel by the incumbent user after time T5.

This illustrates the dynamic availability of different wireless channels bandwidth in a hierarchy as shared in network environment 100. For example, if communication management resource 140 allocates use of wireless channels #7-12 in the hierarchy of available channels to any of base stations, then the communication management resource 140 must de-allocate use of such wireless channels during conditions in which a higher priority so-called incumbent user relinquishes use of wireless channels 7-12 at or around time T5. In such an instance, as previously discussed, the communication management resource 140 deallocates the wireless channels 7-12 from respective wireless stations for use instead by the incumbent user (higher priority user).

FIG. 8 is an example block diagram of a computer system for implementing any of the operations as discussed herein according to embodiments herein.

Any of the resources (such as communication management resource 140, wireless base station 131, customer premises equipment 128, etc.) as discussed herein can be configured to include a respective instantiation of computer processor hardware and corresponding executable instructions to carry out the different operations as discussed herein.

As shown, computer system 850 of the present example includes an interconnect 811 that couples computer readable storage media 812 such as a non-transitory type of media (i.e., any type of hardware storage medium) in which digital information can be stored and retrieved, a processor 813, I/O interface 814, and a communications interface 817.

I/O interface 814 supports connectivity to repository 180 and input resource 892.

Computer readable storage medium 812 can be any hardware storage device such as memory, optical storage, hard drive, floppy disk, etc. In one embodiment, the computer readable storage medium 812 stores instructions and/or data.

As shown, computer readable storage media 812 can be encoded with communication management application 140-1 (e.g., including instructions) to carry out any of the operations as discussed herein.

During operation of one embodiment, processor 813 accesses computer readable storage media 812 via the use of interconnect 811 in order to launch, run, execute, interpret or otherwise perform the instructions in communication management application 140-1 stored on computer readable storage medium 812. Execution of the communication management application 140-1 produces communication management process 140-2 to carry out any of the operations and/or processes as discussed herein.

Those skilled in the art will understand that the computer system 850 can include other processes and/or software and hardware components, such as an operating system that controls allocation and use of hardware resources to communication management application 140-1.

In accordance with different embodiments, note that computer system may be or included in any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or located at multiple disparate locations or can be included in any suitable resource in any network environment to implement functionality as discussed herein.

Functionality supported by the different resources will now be discussed via flowcharts in FIGS. 9 and 10. Note that the steps in the flowcharts below can be executed in any suitable order.

Figure 9:
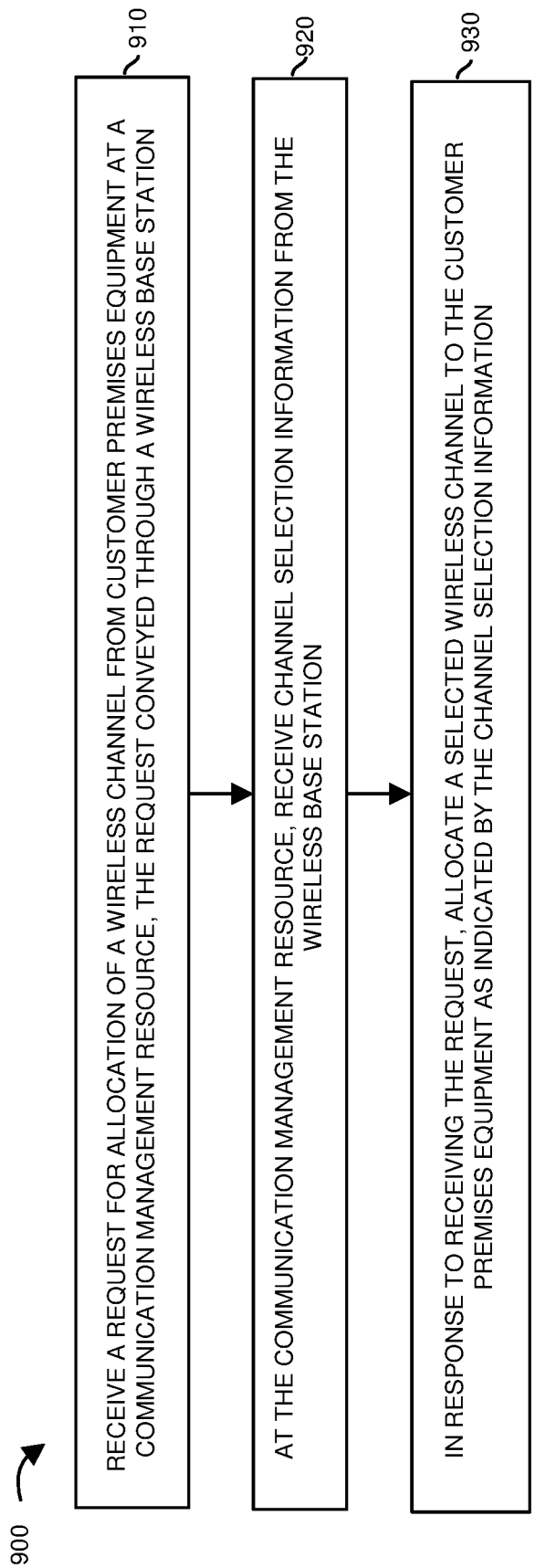
FIG. 9 is an example diagram illustrating a method according to embodiments herein.

FIG. 9 is a flowchart 900 illustrating an example method according to embodiments. Note that there will be some overlap with respect to concepts as discussed above.

In processing operation 910, the communication management resource 140 receives a request (such as communications 325) for allocation of a wireless channel from customer premises equipment 128; the request is conveyed through a wireless base station 131.

In processing operation 920, the communication management resource 140 receives channel selection information (such as via communications 335 indicating wireless channel #10) from the wireless base station 131.

In processing operation 930, in response to receiving the request, the communication management resource 140 allocates a selected wireless channel (such as wireless channel #10) to the customer premises equipment 140 as indicated by the channel selection information.

Figure 10:
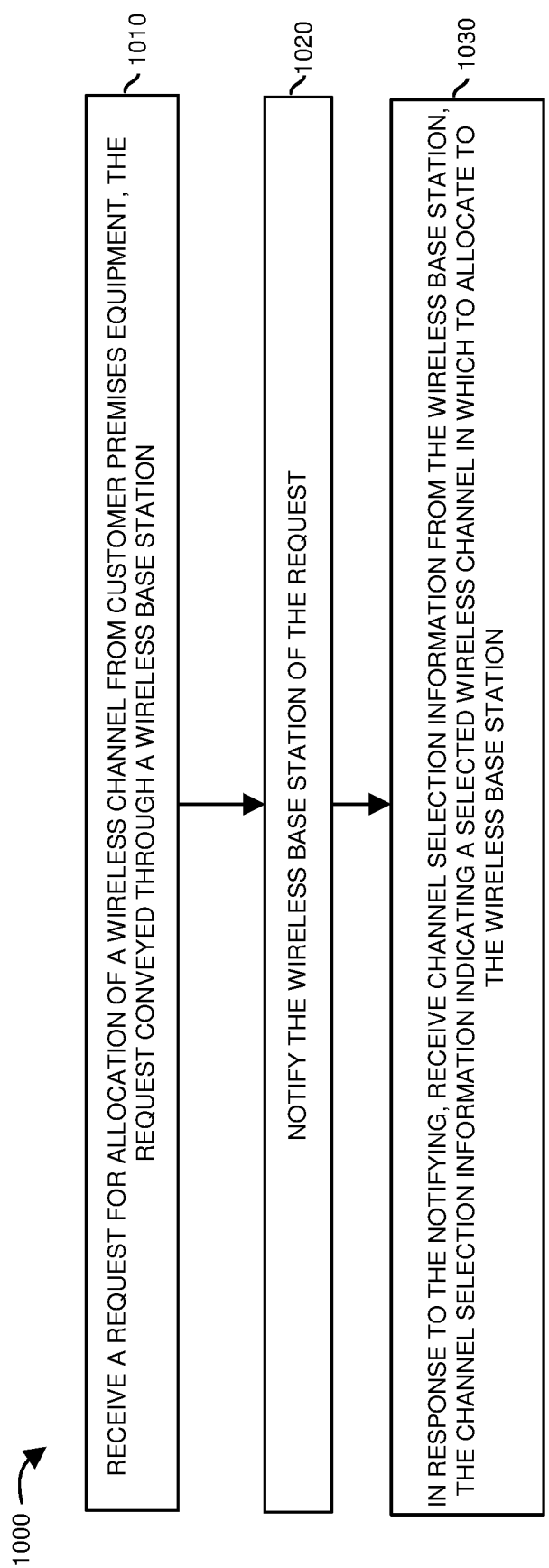
FIG. 10 is an example diagram illustrating a method according to embodiments herein.

FIG. 10 is a flowchart 1000 illustrating an example method according to embodiments. Note that there will be some overlap with respect to concepts as discussed above.

In processing operation 1010, the communication management resource 140 receives a request (such as via communications 325) for allocation of a wireless channel from customer premises equipment 128; the request is conveyed through wireless base station 131 to the communication management resource 140.

In processing operation 1020, the communication management resource 140 notifies the wireless base station 131 of the request (such as via communications 330).

In processing operation 1030, in response to the notifying the wireless base station 131 of the request via communications 330, the communication management resource 140 receives channel selection information (such as via communications 335) from the wireless base station 131. The channel selection information indicates a selected wireless channel (such as wireless channel #10) in which to allocate to the wireless base station 131.

Note again that techniques herein are well suited to facilitate assisted wireless channel allocation in a wireless network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A method comprising:
   at a communication management resource, receiving a request from customer premises equipment for allocation of a wireless channel, the request conveyed through a wireless base station;
   at the communication management resource:
      transmitting a notification from the communication management resource to the wireless base station, the notification notifying the wireless base station of the request from the customer premises equipment for allocation of the wireless channel;
      in response to notifying the wireless base station of the request via the transmitted notification, receiving channel selection information from the wireless base station; and
      in response to receiving the request and the channel selection information, allocating a wireless channel to the customer premises equipment as selected from the channel selection information.

2. The method as in claim 1, wherein notifying the wireless base station of the request includes: communicating identities of multiple wireless channels to the wireless base station; and
   wherein the selected wireless channel is one of the multiple wireless channels.

3. The method as in claim 1 further comprising:
   determining an identity of the selected wireless channel from the channel selection information; and
   wherein allocating the selected wireless channel to the customer premises equipment includes: communicating a message from the communication management resource through the wireless base station to the customer premises equipment, the message indicating the identity of the selected wireless channel allocated to the customer premises equipment.

4. The method as in claim 1, wherein the request is transmitted from the customer premises equipment over a first wireless channel to the wireless base station; and
   wherein the selected wireless channel allocated to the customer premises equipment is a second wireless channel different from the first wireless channel.

5. The method as in claim 4 further comprising:
   subsequent to allocation of the second wireless channel to the customer premises equipment:
      receiving a heartbeat request from the customer premises equipment, the heartbeat request requesting permission to continue using the second wireless channel; and
      in response to receiving the heartbeat request, communicating a heartbeat response to the customer premises equipment.

6. The method as in claim 1, wherein the selected wireless channel is allocated from a tiered hierarchy of wireless channels in which an incumbent user has higher priority rights than the customer premises equipment and the wireless base station.

7. The method as in claim 1 further comprising:
   receiving an identity of the wireless base station from the customer premises equipment generating the request for allocation of the wireless channel.

8. The method as in claim 7 further comprising:
   receiving the identity of the wireless base station from the customer premises equipment during registration of the customer premises equipment with the communication management resource, the request communicated from the customer premises equipment to the communication management resource subsequent to the registration.

9. The method as in claim 1, wherein the channel selection information load balances wireless communications conveyed from multiple instances of customer premises equipment through the wireless base station to a remote network.

10. The method as in claim 1, wherein an identity of the wireless channel allocated to the customer premises equipment is included in the channel selection information communicated from the wireless base station to the communication management resource.

11. The method as in claim 10, wherein the wireless channel is a first wireless channel; and
   wherein the channel selection information includes identities of multiple wireless channels including the identity of the first wireless channel.

12. The method as in claim 1, wherein the wireless channel is a first wireless channel; and
   wherein the channel selection information includes identities of multiple wireless channels including an identity of the first wireless channel and an identity of a second wireless channel.

13. The method as in claim 12, wherein the identity of the first wireless channel is ranked higher in priority than the identity of the second wireless channel in the channel selection information.

14. The method as in claim 1, wherein the channel selection information specifies multiple wireless channels; and
   wherein the channel selection information includes a ranking of the wireless channel amongst multiple wireless channels.

15. The method as in claim 1, wherein the channel selection information is generated by the wireless base station based on wireless channels currently in use by the wireless base station to support wireless connectivity.

16. The method as in claim 1, wherein the request received from the customer premises equipment includes an identity of the wireless base station, the customer premises equipment in communication with the wireless base station via a wireless communication link.

17. The method as in claim 1, wherein notifying the wireless base station of the request includes:
notifying the wireless base station of an identity of the customer premises equipment.

18. The method as in claim 1, wherein the allocated wireless channel is a first wireless channel; and
wherein the request received at the communication management resource from the customer premises equipment is conveyed over a second wireless channel from the customer premises equipment to the wireless base station.

19. The method as in claim 1, wherein the allocated wireless channel is a first wireless channel; and
wherein allocating the wireless channel to the customer premises equipment incudes communicating an identity of the first wireless channel from the communication management resource to the customer premises equipment, the allocation of the first wireless channel prompting the customer premises equipment to switchover from using a second wireless channel to communicate with the wireless base station to using the first wireless channel to communicate with the wireless base station.

20. The method as in claim 1, wherein the wireless channel is allocated to the customer premises equipment to provide load balancing amongst multiple wireless channels including the wireless channel.

21. The method as in claim 1, wherein the wireless channel is allocated by the communication management resource to the customer premises equipment based on how many different instances of customer premises equipment are allocated use of the wireless channel.

22. The method as in claim 1, wherein the channel selection information indicates a priority ranking of wireless channels including the wireless channel.

23. The method as in claim 1, wherein the communication management resource receives the request subsequent to completing registration of the customer premises equipment for wireless channel allocation.

24. The method as in claim 1, wherein the notification includes identities of multiple wireless channels including a first wireless channel and a second wireless channel.

25. The method as in claim 24, wherein the channel selection information specifies the first wireless channel for allocation because the first wireless channel is least used amongst multiple instances of customer premises equipment in a wireless network environment.

26. The method as in claim 1, wherein the request is conveyed from the customer premises equipment through the wireless base station to the communication management resource.

27. A method comprising:
via a communication management resource managing allocation of wireless channels in a network environment:
receiving a request for allocation of a wireless channel from customer premises equipment, the request conveyed through a wireless base station to the communication management resource;
as a response to receiving the request from the customer premises equipment for allocation of the wireless channel, notifying the wireless base station of the request received from the customer premises equipment; and
in response to notifying the wireless base station of the request, receiving channel selection information from the wireless base station, the channel selection information indicating a selected wireless channel amongst the wireless channels for allocation to the wireless base station.

28. The method as in claim 27 further comprising:
determining an identity of the selected wireless channel from the channel selection information;
allocating the selected wireless channel for use by the customer premises equipment; and
communicating a message from the communication management resource through the wireless base station to the customer premises equipment, the message indicating the identity of the selected wireless channel allocated to the customer premises equipment.

29. The method as in claim 27, wherein the request is transmitted from the customer premises equipment over a first wireless channel to the wireless base station; and
wherein the selected wireless channel is a second wireless channel allocated to the customer premises equipment.

30. The method as in claim 27, wherein the selected wireless channel is allocated from a tiered hierarchy of wireless channels in which an incumbent user has higher priority rights than the customer premises equipment and wireless base station.

31. The method as in claim 27, wherein notifying the wireless base station of the request includes: communicating identities of a set of multiple wireless channels to the wireless base station; and
wherein the selected wireless channel is one of the multiple wireless channels in the set.

32. A system comprising:
communication management hardware in communication with customer premises equipment through a wireless base station, the communication management hardware operative to:
receive a request for allocation of a wireless channel from the customer premises equipment, the request conveyed through the wireless base station;
subsequent to receiving the request for allocation of the wireless channel, receive channel selection information from the wireless base station, the channel selection information received from the wireless base station in response to notifying the wireless base station of the request; and
in response to receiving the request and receiving the channel selection information, allocate a selected wireless channel to the customer premises equipment as indicated by the channel selection information.

33. The system as in claim 32, wherein the communication management hardware is further operative to:
communicate identities of multiple wireless channels to the wireless base station; and
wherein the selected wireless channel is one of the multiple wireless channels.

34. The system as in in claim 32, wherein the communication management hardware is further operative to:
determine an identity of the selected wireless channel from the channel selection information; and
communicate a message through the wireless base station to the customer premises equipment, the message indicating the identity of the selected wireless channel allocated to the customer premises equipment.

35. The system as in claim 32, wherein the request is transmitted from the customer premises equipment over a first wireless channel to the wireless base station; and wherein the selected wireless channel allocated to the customer premises equipment is a second wireless channel.

36. The system as in claim 35, wherein the communication management hardware is further operative to:

subsequent to allocation of the second wireless channel to the customer premises equipment:

receive a heartbeat request from the customer premises equipment, the heartbeat request requesting permission to continue using the second wireless channel; and in response to receiving the heartbeat request, communicate a heartbeat response to the customer premises equipment.

37. The system as in claim 32, wherein the selected wireless channel is allocated from a tiered hierarchy of wireless channels in which an incumbent user has higher priority rights than the customer premises equipment and wireless base station.

38. The system as in claim 32, wherein the communication management hardware is further operative to: receive an identity of the wireless base station from the customer premises equipment generating the request for allocation of the wireless channel.

39. The system as in claim 38, wherein the communication management hardware is further operative to: receive the identity of the wireless base station from the customer premises equipment during registration of the customer premises equipment with the communication management hardware.

40. The system as in claim 32, wherein the channel selection information load balances wireless communications conveyed from multiple customer premises equipment through the wireless base station to a remote network.

41. Computer-readable storage hardware having instructions stored thereon, the instructions, when carried out by computer processor hardware, cause the computer processor hardware to:

at a communication management resource, receive a request for allocation of a wireless channel from customer premises equipment, the request conveyed through a wireless base station;

at the communication management resource, receive channel selection information from the wireless base station in response to notifying the wireless base station of the request; and in response to receiving the request and channel selection information, allocate a selected wireless channel to the customer premises equipment as indicated by the channel selection information.

* * * * *

UNITED STATES PATENT AND TRADEMARK OFFICE
CERTIFICATE OF CORRECTION

| | | |
|---|---|---|
| PATENT NO. | : 12,022,298 B2 | Page 1 of 1 |
| APPLICATION NO. | : 17/008965 | |
| DATED | : June 25, 2024 | |
| INVENTOR(S) | : Lakhbir Singh | |

It is certified that error appears in the above-identified patent and that said Letters Patent is hereby corrected as shown below:

In the Claims

Claim 34, Line 1, change "in in" to --in--

Signed and Sealed this
Thirteenth Day of August, 2024

*Katherine Kelly Vidal*

Katherine Kelly Vidal
*Director of the United States Patent and Trademark Office*